United States Patent [19]

Dayton

[11] 4,219,090
[45] Aug. 26, 1980

[54] WEIGHING DEVICE

[76] Inventor: Arnold J. Dayton, 12718-37th Ave. NE., Seattle, Wash. 98125

[21] Appl. No.: 29,565

[22] Filed: Apr. 13, 1979

[51] Int. Cl.² .................................................. G01G 5/04
[52] U.S. Cl. .................................... 177/208; 177/254
[58] Field of Search ......................... 177/208, 209, 254

[56] References Cited

U.S. PATENT DOCUMENTS

| | | | |
|---|---|---|---|
| 1,893,858 | 1/1933 | Carlson | 177/208 X |
| 2,516,545 | 7/1950 | Brewster | 177/208 |
| 2,795,410 | 6/1957 | Reynard | 177/208 |
| 3,433,316 | 3/1969 | Newman | 177/208 |
| 3,637,034 | 1/1972 | Wickenberg | 177/208 |
| 3,658,142 | 4/1972 | Marshall et al. | 177/208 |
| 3,658,143 | 4/1972 | Schwartz | 177/208 |
| 4,056,156 | 11/1977 | Dayton | 177/209 |

*Primary Examiner*—George H. Miller, Jr.
*Attorney, Agent, or Firm*—Cole, Jensen, Puntigam

[57] ABSTRACT

A combination mechanical-hydraulic weighing device having a platform assembly within which is located a single hydraulic load cell, a unique hydraulic fluid path, and a unique platform leveling mechanism. A flexible hose interconnects the platform assembly with a weight indicator assembly attached to a convenient wall at eye level. The gage indicator is moved by a hydraulic pressure actuated Bourdon tube which can be calibrated accurately for any specific weight up to three hundred pounds. The hydraulic load cell and indicator are sized to complement each other and the hydraulic pressure in the system does not exceed fifty pounds per square inch.

4 Claims, 5 Drawing Figures

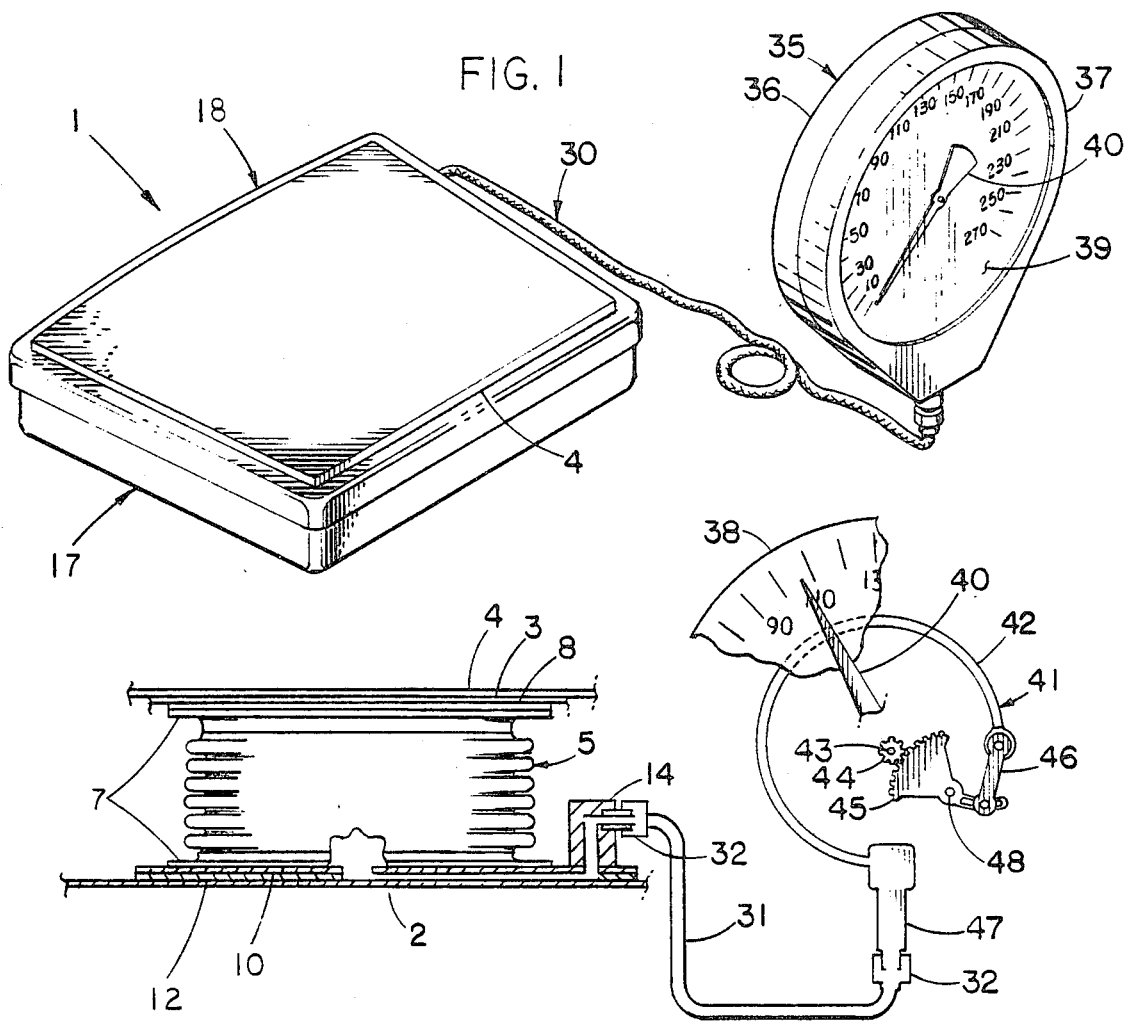
FIG. 1
FIG. 2
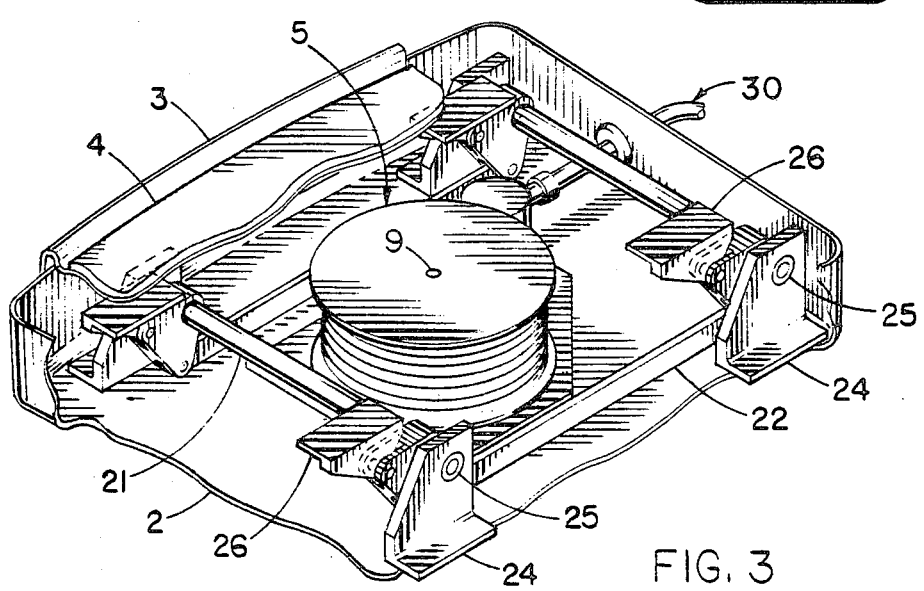
FIG. 3

WEIGHING DEVICE

BACKGROUND OF THE INVENTION

This invention relates to weighing scales and more particularly to hydraulic weighing scales intended primarily for medical office or home bathroom use to accurately indicate a person's weight by means of a convenient readout at eye level. As those skilled in the art are aware, many types of scales have been designed to satisfy this function but no one has designed and marketed a successful hydraulic or pneumatic type. This invention eliminates the technical mistakes of previous hydraulic scale designs by using a low pressure system, incorporating a positive low friction leveling mechanism, placing the weight readout at eye level, using a minimum number of simple parts, and using overall cost effective fabrication and assembly techniques.

The three most common personnel type scales on the present market are as follows:

(1) The spring and lever type with dial readout incorporated into the platform assembly.

(2) The spring and lever type with a potentiometer, electric circuit board, and battery operated electric digital readout in the platform assembly.

(3) The mechanical spring and lever operated or balanced beam unit with the readout at waist level.

The (1) spring and lever is the most inaccurate and the most popular probably because it is the least expensive. It consists of many parts all incorporated into the platform assembly and it has no calibration capability to any specific weight. All manufacturing tolerances (which are cumulative) are built into the assembly resulting in a scale that cannot be expected to indicate a person's weight accurately within several pounds, the amount of error varying from plus to minus for each assembly. The weight readout, which is in the platform, is too far away from a person's eyes and cannot be read easily, especially since it is sensitive to any motion of the person standing on the platform.

The (2) electro-mechanical type with electrical digital readout is a scale that has the same disadvantages as the (1) spring and lever type and has the additional disadvantages of requiring batteries to provide a lighted electrical readout and the inevitable replacement of these batteries at any inconvenient time. This type of scale will probably never use common household 115 volt alternating current because of building codes that disallow any electrical floor outlets in bathrooms that have bathtubs. These building restrictions are necessary due to the hazard that is present when an electrical appliance can fall into a bathtub as it is being used and electrocuting its occupant. This scale is also several times more expensive than the (1) spring and lever type. It has gained very low public acceptance.

The (3) spring and lever type or balanced beam type scale with a post to raise the weight readout to waist level is an improved version over the heavy five and one-half foot high scales still being used in hospitals and medical offices. This scale has had some success in replacing the larger scales in medical facilities but it will never be successful for consumer usage in the home because of its excessive size, weight, and cost. Additionally, most housewives would not consider it attractive enough for home usage.

Purely hydraulic units have tried to do the weighing job with one small flexible load cell which requires a high pressure gage. Thus one of the problems with purely hydraulic units has been too high an operating pressure. Additionally, tests have shown that a small load cell cannot transmit the desired load to the indicator to deflect it throughout its entire range. Small amounts of air entrapped in the fluid load path plus deflection of the bellows convolutions in an axial direction result in pressure losses that preclude proper deflection of the Bourdon tube assembly. When a weighing scale system involves high pressure it is also susceptible to developing leaks and it is too inaccurate due to the unnecessary high weight to deflection ratio. High pressure weighing scales would have a small fluid displacement so that calibration of the Bourdon tube assembly to indicate correct weight would be difficult if not impossible. In short, a small amount of liquid moved means high pressure and a small amount of deflection in the platform and load cell. Another problem is that most present bathroom scales do not adequately compensate for a load that is not centered properly on the platform. Their best accuracy depends upon centering of the load on the platform and this degree of load equalization is not always achieved nor can it be expected using the existing proposed methods.

This invention provides a mechanism that keeps the platform cover level in all planes regardless of off center load placement. It contributes a minimum of friction, and transmits the load equally into the top of the load cell. Patents which are of interest but not particularly pertinent to the instant invention except for U.S. Pat. No. 4,056,156 are U.S. Pat. Nos. 2,795,410, 2,516,545, 3,637,034, and 3,433,316.

SUMMARY OF THE INVENTION

The invention is a personnel weighing device or scale using hydraulic fluid as the load transmitting medium. It consists of a platform assembly, an indicator assembly, and a flexible hose interconnecting the two assemblies. The platform assembly consists of a platform base and cover, a single flexible and compressible load cell, four attaching brackets, a leveling mechanism, a flat sheet fluid channel, and a post for connection of the flexible hose assembly. The leveling mechanism interconnects the platform base and cover and it consists of two shafts, four sectors, and two interconnecting links. It maintains the platform cover in a horizontal position and compensates for off center loading. The indicator assembly consists of a Bourdon tube assembly, a dial divided into increments of pounds and/or kilograms, a window, and a pointer. A flexible hose assembly interconnects the indicator assembly and the platform assembly. The load transmitting medium is a hydraulic fluid, preferably oil or water mixed with an anti-freeze, although other hydraulic mediums may also be utilized.

Accordingly, it is among the objectives, features and advantages of the instant invention to provide an accurate and low cost weighing device. It utilizes a single low pressure load cell (fifty pounds per square inch maximum) which is designed to compress under load and displace as much hydraulic fluid as is necessary to deflect the Bourdon tube assembly and its pointer to full weight indication on the dial. The Bourdon tube assembly is of a design and type used in low pressure gauges that read up to approximately fifty pounds of pressure. The design results in low pressure in the system fluid path, is inexpensive, rugged, and reliable. Because of the minimum number of connections and positive sealing at all interfaces, the system is not susceptible to leakage. The scale assembly is accurate and once calibrated is not easily disturbed. The quantity of fluid is relatively large compared to other proposed prior art devices. The spring rate that is inherent in the curved Bourdon tube assembly and the flexible metal bellows load cell returns the dial pointer to the zero position when the load is removed.

BRIEF DESCRIPTION OF DRAWINGS

FIG. 1 shows an isometric view of the complete hydraulic weighing device as it would appear ready for installation and use.

FIG. 2 is an isometric view of the complete hydraulic load path showing the indicator Bourdon tube assembly with pointer and how they are hydraulically actuated.

FIG. 3 is an isometric view of the platform assembly with most of the platform cover removed to show all of its components in position.

DESCRIPTION OF PREFERRED EMBODIMENT

Figure 4:
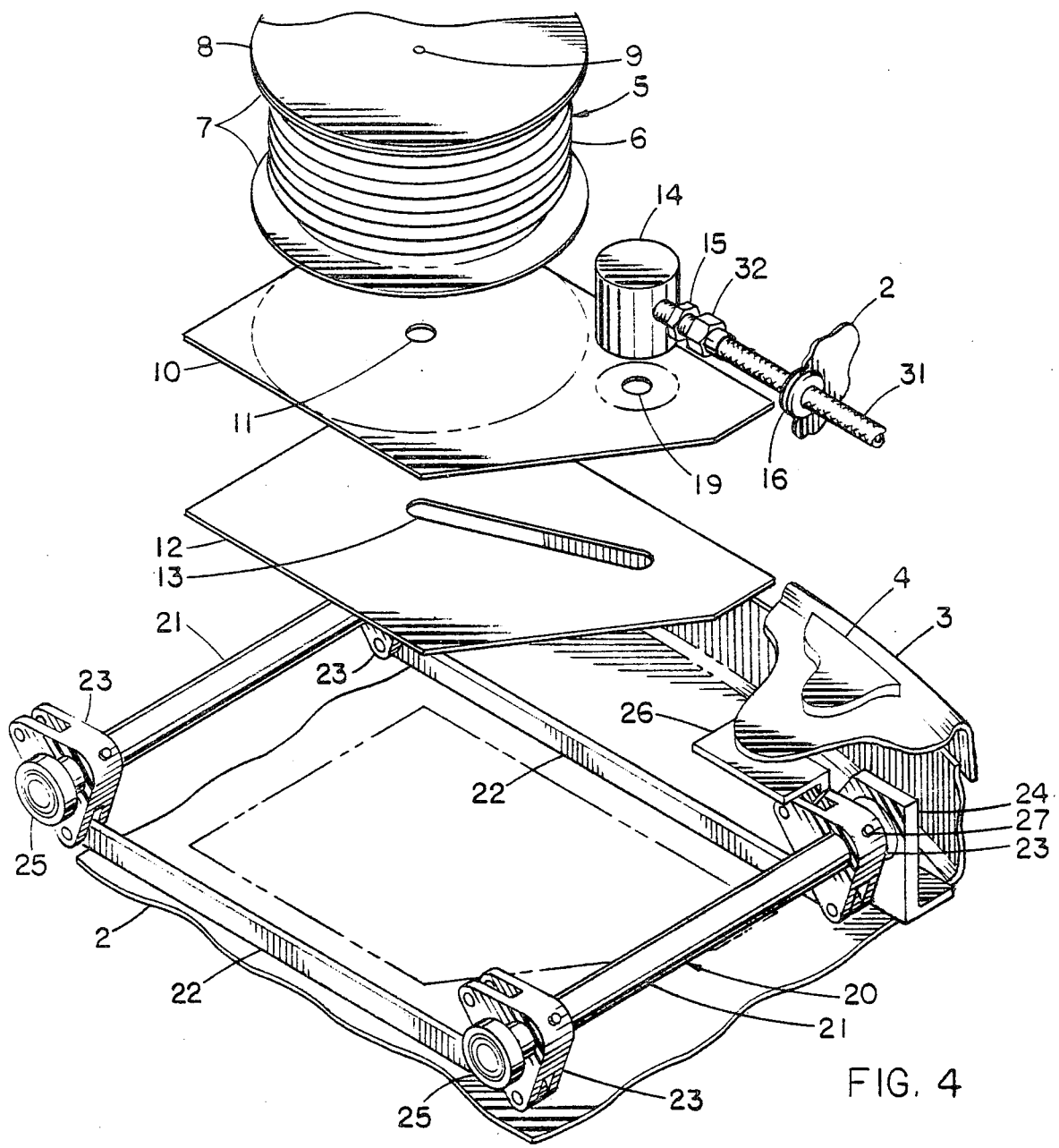
FIG. 4 is an isometric view of the platform assembly exploded to show its components and particularly the leveling mechanism in greater detail.
Figure 5:
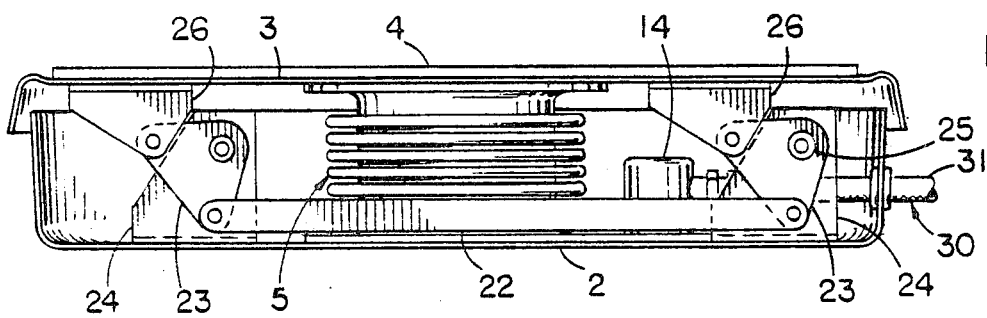
FIG. 5 is an orthographic view showing a cross section of the platform assembly.

The weighing device consists of three major components: the platform assembly number 1, the indicator assembly number 35, and the interconnecting flexible hose assembly number 30. The platform assembly 1 consists of two major sub assemblies, the base sub assembly 17 and the cover sub assembly 18. The base sub assembly 17 has a base 2 with upstanding sidewalls all around, a center plate 12, an upper plate 10, a load cell assembly 5, a connector post 14, a post fitting 15, and a wall grommet 16. The center plate 12, the upper plate 10, and the load cell assembly 5 are attached to the base 2 by roll seam welding or brazing to provide a positive hydraulic seal. The post 14 is attached to the upper plate 10 by brazing or other positive means. The load cell assembly 5 consists of a flexible metal bellows 6, two sheet metal formed flanges 7, and a cover 8 roll seam welded or brazed together. The cover 8 has a bleed hole 9 to permit release of entrapped air when filling the unit. After filling the assembly with hydraulic fluid it is permanently sealed by welding or soldering.

The cover sub assembly 18 consists of a cover 3, a decorative pad 4, four cover attaching brackets 26, a leveling mechanism 20, four bearings or bushings 25, and four base attaching brackets 24. The cover 3 has a downward turning flange all around with approximately a ¼ inch gap between it and the base sidewalls to permit free vertical movement between the two parts. Together they form an enclosed unit for the interior components. The configuration of the base 2 and cover 3 may be approximately trapazoidal as shown or any other shape such as oval, round, rectangular, or square. The leveling mechanism sub assembly 20 consists of two shafts 21, two links 22, four bearings or bushings 24, and suitable fasteners 27 such as roll pins.

The hose assembly 30 consists of the hose 31, and two pressure tight fittings 32. For final assembly of the weighing device the hose is inserted through the base 2 sidewall and the grommet 16 and attached to the post fitting 15.

The indicator assembly 35 consists of a flanged housing 36, a flanged cover 37, a Bourdon tube assembly 41, a dial 38, a window 39, and a pointer 40. The Bourdon tube assembly 41 consists of a curved tube 42, a fitting 47, a link 46, a gear sector 45, a sector shaft 48, a pinion gear 44, and a pointer shaft 43. The Bourdon tube assembly 41 per se, while a necessary part of the weighing device, is well known and old in the art.

Assembly and filling of the weighing device with hydraulic fluid is accomplished in the following manner: with the hose assembly attached to the base assembly, hydraulic fluid is forced into the upper end of the hose until is completely fills the hose assembly and the load cell. The bleed hose is then closed by welding or soldering to effect a permanent seal. The indicator assembly housing 36 with the Bourdon tube assembly 41 attached is then inverted, evacuated of all air and filled with hydraulic fluid. The hose assembly 30 is then connected to the Bourdon tube fitting 47. Any small amount of air that may be entrapped in the system when this connection is effected is not significant or detrimental. It will merely be compressed when the weighing device is used until the air pressure equals the hydraulic pressure. The load cell is sized to accommodate this extra minor deflection that will be required. The platform cover sub assembly 18 may then be assembled to the base sub assembly 17 by attaching the four base brackets 24 to the bottom of the base 2. This operation must be accomplished with the platform assembly in the inverted position and with the use of permanent blind fasteners.

The operation of the weighing device is based on the principle of taking a weight, converting it to pressure, and then converting it back again into a weight readout. This is accomplished by the proper sizing of the flexible load cell to the gage capability and providing a positive pressure seal between the two. Manufacturing tolerances, which are inevitable, can be calibrated out of the system resulting in an accurate weight measuring unit. When a load, such as a person, is placed on the platform assembly 1 the leveling shafts 21 rotate in the bearings 25, the platform cover 3 moves downward and the load is transmitted directly into the hydraulic load assembly 5. The load cell compresses approximately ¼ inch at full load forcing the hydraulic fluid pressure through the upper plate center hole 11 into the slot 13 of center plate 12. From the slot the fluid pressure is transmitted through the hole 19 in the upper plate 10 and then into the post 14 and the hose assembly 30. The hose assembly transmits the hydraulic pressure into the Bourdon tube assembly 41. This pressure deflects the curved tube 41 which rotates the gear sector 45 thru the link 46. This rotation is transmitted into the pinion gear 45 and pointer 40 to indicate the proper load on the dial 38.

Calibration of the device is accomplished before the indicator cover 37, window 39, and the pointer 40 are assembled into the indicator assembly 35. It is accomplished by placing a known calibrated load of 150 pounds, for example, on the platform. Test equipment, which is available on the market for calibrating gages, may be modified and used for this purpose. When this load is placed on the platform, hydraulic fluid pressure from the load cell 5 deflects the Bourdon tube 41 which rotates the gear sector 45, the pinion gear 44, and the pinion gear shaft to the proper position to reflect this precise weight. The pointer 40 is then assembled on the shaft 43 so that it indicates the exact amount of weight being used for calibration. The rate of the Bourdon tube assembly may also be calibrated so that the pointer reads zero and 270 pounds when these two weights are checked. This calibration is effected by adjustment of the link 46 in the slot of the gear section 45. After the calibration of the unit the indicator window 39 and the cover 37 are assembled and the weighing device is ready for use.

What is claimed is:

1. A mechanical-hydraulic weighing device comprising:
   (a) a housing having a base member including a bottom with upstanding side walls and a detached cover with downwardly extending side walls to define a generally enclosed housing interior, said base member and cover having clearance therebetween to permit free, relative motion between the same, said housing interior also having cover leveling means therein,
   (b) a flexible metal, low pressure fluid load cell approximately centered in the base and sized to operate with less than fifty pounds per square inch pressure when subjected to a maximum load of three hundred pounds, said load cell being operatively contacted by said cover,
   (c) mounting means for said load cell including conduit means comprising a pair of upper and lower plates, the lower of which has an elongated slot and the upper of which has holes registering with each end of said slot, one hole registering with and connected to said load cell and the other registering with and connected to said connector post to form a fluid path,
   (d) connector post means attached to said mounting means and including fitting means for attaching a hose thereto,
   (e) a hose assembly attached to said connector post means, and
   (f) a weight indicator housing containing a hydraulically actuated assembly and indicator, and a dial divided into weight increments for visual reading of said indicator with respect to said dial.

2. The weighing device according to claim 1 and having an unique leveling mechanism which interconnects the base and cover in a stable position when a load is placed on it, said leveling mechanism being designed in such a manner that it drops out of the load path almost completely as the platform load becomes approximately centered.

3. The weighing device according to claim 1, and in which said lower plate attaches to the bottom of said base and said upper plate is superimposed thereon, said plates being connected to the base bottom and each other in such a way as to insure a sealed fluid path.

4. The weighing device according to claim 3 and in which said connector post and load cell are mounted on and attached to said upper plate.

* * * * *